United States Patent
Hochstein

(10) Patent No.: US 6,603,137 B2
(45) Date of Patent: Aug. 5, 2003

(54) DIFFERENTIAL IMAGING RAIN SENSOR

(75) Inventor: Peter A. Hochstein, Troy, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 91 days.

(21) Appl. No.: 09/835,755

(22) Filed: Apr. 16, 2001

(65) Prior Publication Data

US 2002/0148986 A1 Oct. 17, 2002

(51) Int. Cl.$^7$ ............................................. G01N 21/85
(52) U.S. Cl. ..................... 250/573; 250/208.1; 318/443
(58) Field of Search ................... 250/573, 574, 250/208.1, 214 R, 214 AL, 214 B, 341.8, 349, 227.25; 318/443, 444, 480, 483, DIG. 2; 15/DIG. 15, 250.001, 250.01, 250.12; 340/602, 604

(56) References Cited

U.S. PATENT DOCUMENTS

| | | | |
|---|---|---|---|
| 4,476,419 A | 10/1984 | Fukatsu et al. | 318/444 |
| 4,595,866 A | 6/1986 | Fukatsu et al. | 318/444 |
| 4,636,643 A | 1/1987 | Nakamura et al. | 250/338 |
| 4,676,638 A | 6/1987 | Yasuda | 356/237 |
| 4,798,956 A * | 1/1989 | Hochstein | 15/DIG. 16 |
| 5,059,877 A * | 10/1991 | Teder | 15/250.001 |
| 5,313,072 A | 5/1994 | Vachss | 250/573 |
| 5,537,003 A | 7/1996 | Bechtel et al. | 315/82 |
| 5,703,568 A * | 12/1997 | Hegyi | 15/250.01 |
| 5,923,027 A | 7/1999 | Stam et al. | 250/208.1 |
| 6,020,704 A * | 2/2000 | Buschur | 15/250.12 |
| 6,144,022 A * | 11/2000 | Tenenbaum et al. | 15/DIG. 15 |
| 6,320,176 B1 * | 11/2001 | Schofield et al. | 250/208.1 |
| 6,376,824 B1 * | 4/2002 | Michenfelder et al. | 250/214 R |

* cited by examiner

*Primary Examiner*—Kevin Pyo
*Assistant Examiner*—Seung C. Sohn
(74) *Attorney, Agent, or Firm*—Howard & Howard

(57) ABSTRACT

A method and assembly for sensing moisture on the exterior surface of a sheet of glass (16) by capturing an ambient image (A) of light rays passing through the glass (16) from the exterior to the interior surfaces thereof under ambient light conditions. The invention is characterized by illuminating (18) the glass with pulses of light rays, capturing an illuminated image of the glass containing the ambient image (A) plus the illuminated image (B) containing the reflected light from the illuminating (18) of the glass (16) between the ambient images (A), and subtracting each ambient image (A) from the next adjacent illuminated image (B) to produce a moisture signal (30).

13 Claims, 2 Drawing Sheets

DIFFERENTIAL IMAGING RAIN SENSOR

RELATED APPLICATION

This application is an improvement over co-pending application Ser. No. 09/267,867 filed Mar. 12, 1999 (attorney docket 65165.004) and assigned to the assignee of the subject invention.

BACKGROUND OF THE INVENTION

1. Field of the Invention

The subject invention relates to a rain sensor for detecting moisture on the windshield of a vehicle for turning on the windshield wipers, moisture taking the form of mist, water, drops as a film, frost, ice, snow, fog, etc.

2. Description of the Prior Art

Various optical rain-sensing methods have been developed in order to permit fully automatic windshield wiper operation, particularly for automotive vehicles. These range from simple extinction and backscatter sensors, such as those described in U.S. Pat. Nos. 4,798,956 and 4,960,996 to P. A. Hochstein, to more sophisticated imaging sensors, such as those shown in U.S. Pat. No. 5,923,027 to Stam, et al and U.S. Pat. No. 6,144,022 to Tenenbaum, et al.

The problem with extinction sensors is that their field of view or active area is rather small, generally on the order of 500 mm$^2$. Human factor experiments have shown, however, that sensing areas on the order of $10^4$ mm$^2$ are necessary to properly control the windshield wipers in vehicles. The reason for such a relatively large sensing area on the glass is that drivers want a certain level of minimum clear vision. That is, drivers want a given degree of visibility that is a function of ambient conditions and rain profile. Small and closely spaced droplets are generally not viewed as deleterious to safe vision as are a few large drops, which may be spaced at greater distances from one another. On the basis of several careful human factors studies, it has been determined that a sensing area of at least 8000 mm$^2$ was necessary, and a minimum water drop sensitivity of 1.0 mm (diameter) was desirable.

Achieving such relatively large sensing areas with extinction rain sensors is unwieldy and possibly unsafe. All known extinction rain sensors are directly mounted to the glass, and as such would obscure the driver's vision if they were large enough to be truly useful.

Off the glass rain sensors are more easily adapted to provide a greater field of view of the windshield, and may be mounted away from the glass thereby providing less (or no) obscuration of the glass. Various imaging rain sensors such as the backscatter sensor of the U.S. Pat. No. 5,313,072 to Vachss or the spatial image analysis sensor of U.S. Pat. No. 5,923,027 to Stam, et. al employ lenses and focal plane arrays to permit remote sensing rather than on the glass sensing. The image correlation rain sensor of the aforementioned U.S. Pat. No. 6,144,022 to Tenenbaum, et al and the aforementioned Ser. No. 09/267,867 filed Mar. 12, 1999 (attorney docket 65165.004) also create a sequence of images by means of a lens and a CMOS imager or focal plane detector, both of which allows for remote mounting.

All these sensors do provide the necessary convenience of remote measurement of a relatively large, representative portion of the windshield, but they do so at a high price. Their sensitivity and selectivity to rain is limited. That is, the signal to noise ratio implicit in these imaging rain sensors is low and the respective devices are prone to mis-trigger, false trigger or do not respond to rain in certain operating conditions.

The primary interference to all optical, imaging rain sensors reside in the intense ambient light or specular light sources which fall within the field of view of the sensor; in other words, the existing artifacts and spurious signals in the ambient surroundings interfere with or provide false sensing indicating the false presence of raindrops. Certain accommodations, such as fast low f/member optical systems, can minimize such interference by maximizing the image contrast for objects at or close to the windshield. However, the very large variances in ambient light, typically $10^{-2}$ Lux to over $10^4$ Lux, intrinsically limit the efficacy of single ended signal processing systems. In other words, not knowing what signal to expect limits the filtering one can apply to the captured image. While certain assumptions can reasonably be made as to the nature of rain drop distribution across the glass, the variety of driving conditions precludes the use of image templates or similarly narrow filtering algorithms. Specifically, it is rapidly changing ambient light or lighted artifacts that confuse these prior art, imaging rain sensors, i.e., create the interference. As an example, the sophisticated sensor shown in the aforementioned U.S. Pat. No. 6,144,022 to Tenenbaum et al. al uses a digital correlation technique to discriminate between raindrops and slowly changing ambient lighting conditions. Under the influence of quickly moving headlights or tail/brake lamps, the subsequent image frames are no longer correlated, thereby assuming a rain condition, i.e., presence of raindrops. Even by defocusing the interfering image by using very low f/number optics, sufficient changing energy from extraneous sources has been found to interfere with sensor operation. The same is true in the aforementioned application Ser. No. 09/267,867 filed Mar. 12, 1999 (attorney docket 65165.004) in that sequential images are taken which include the changing ambient light conditions, which may include constantly changing interfering artifacts and spurious light. The prior art which sometimes uses ancillary illumination to improve rain drop image contrast, does not synchronously pulse the illumination source with the imager (camera) framing interval.

Accordingly, there remains a need for a more precise imaging rain sensor to activate the wipers only in response to a predetermined level of moisture on the windshield and not be affected by the constantly changing interfering artifacts and spurious light signals in the ambient light.

SUMMARY OF THE INVENTION AND ADVANTAGES

The present invention greatly improves the selectivity of imaging rain sensors to rain while simultaneously rejecting interfering artifacts and spurious signals.

In accordance therewith, the invention provides a method for sensing moisture on the exterior surface of a sheet of glass including the step of capturing an ambient image of light rays passing through the glass from the exterior to the interior surfaces thereof under ambient light conditions. The method is characterized by illuminating the glass with light rays, capturing an illuminated image of the glass containing the ambient image plus reflected light from the illuminating of the glass, and subtracting the ambient image from the illuminated image to produce a moisture signal.

The invention also provides an assembly for sensing moisture on a glass surface from a position adjacent the glass comprising a light source for illuminating the glass with light rays, and an imaging device adapted for disposition adjacent to the interior surface of a sheet of glass for capturing an ambient image of light rays passing through the glass from the exterior to the interior surfaces thereof under ambient light conditions and for capturing an illuminated image of the glass containing the ambient image plus reflected light from the illuminating of the glass. The assembly is characterized by a controller for subtracting the ambient image from the illuminated image to produce a moisture signal.

Synchronous detection, or more precisely, differential image analysis of the present invention yields benefits similar to those (in terms of s/n ratio) that accrue in other (communications) applications. Those benefits are due to the fact that the pulsed illuminant only illuminates the subject of interest, which is water drops on the outer surface of the windshield. Extraneous objects, which lie outside the object plane, are not illuminated to any substantial degree, thereby greatly improving differential rain sensor selectivity.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
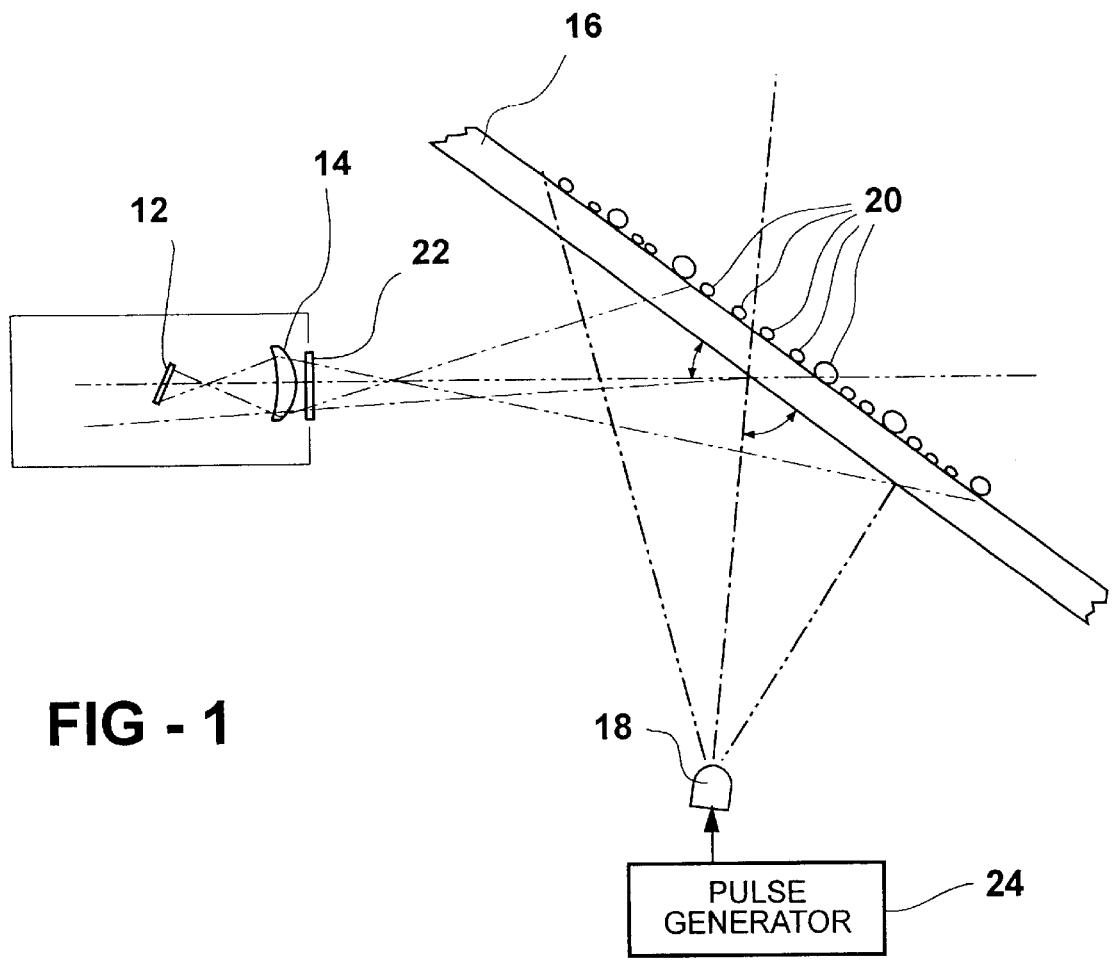
FIG. 1 is a schematic of a typical application of the subject invention.

Referring to the Figures, wherein like numerals indicate like or corresponding parts throughout the several views, an imager device includes focal plane image sensor 12 used in conjunction with an image forming lens 14 to view a portion of a windshield 16. A pulsed infrared (IR) light source 18 illuminates this viewed portion of the glass with light rays so that any rain drops 20 or other moisture specularly reflects a portion of the modulated and/or pulsed radiation. The lens 14 focuses such specular reflections onto the focal plane array 12 for detection and analysis. Note that the illuminator is not imaged as in the prior art. A filter 22 is included in the imager device for optically filtering the ambient light to the focal plane imager 12 to wavelengths in a predetermined range including the wavelength of the illuminating light rays from the light source 18.

Pulsed illumination for differential image subtraction may be provided by solid state sources 18 such as LEDs or even laser diodes. Alternatively, a pulsed discharge source 18 such as a xenon strobe or similar source may be utilized. In all cases, the illuminant source 18 would be optically filtered by a filter 22 or intrinsically restricted to emissions in the non-visible spectrum. Naturally, the presence of a bright, pulsing light source would be very distracting to drivers. Forcing the illuminator 18 to operate outside the visible spectrum solves this problem. Since most solid state imagers (i.e., cameras) exhibit significant sensitivity to near IR wavelengths, common 880 nm LEDs may be conveniently used as a high efficiency, low cost, essentially invisible illuminator 18. For the purpose of this invention, near IR energy is considered as a suitable illuminant 18 even though the energy is not luminous and is not visible to the human eye.

The imager device, including the imager 12, the lens 14 and the filter 22, is adapted for disposition adjacent to the interior surface of the sheet of glass 16 for capturing an ambient image of light rays passing through the glass 16 from the exterior to the interior surfaces thereof under ambient light conditions and for capturing an illuminated image of the glass 16 containing the ambient image plus reflected light from the illuminating of the glass 16 by the light source 18.

As alluded to above, light source 18 includes a pulse generator 24 for pulsing light rays toward the glass 16 to provide pulses of light separated by ambient images.

Figure 2:
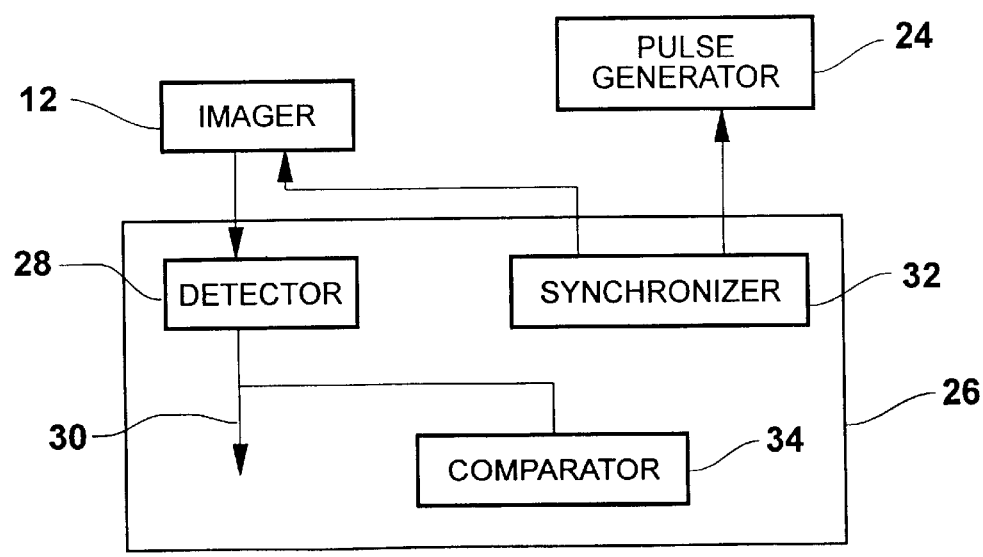
FIG. 2 is a block diagram of a controller utilized in the subject invention.

The assembly is characterized by a controller 26, shown in FIG. 2, for subtracting the ambient image from the illuminated image to produce a moisture signal. The controller 26 includes a moisture signal detector 28 for measuring the moisture signals and producing an actuation signal in response to said moisture signal reaching a predetermined level. The controller 26 includes a synchronizer, i.e., a synchronizing device 32, for controlling the imaging device for capturing an illuminated image during the pulses and capturing an ambient image immediately adjacent each of the illuminated images to define a differential pair of images which are subtracted from one another to provide a series of moisture signals 30.

Figure 3:
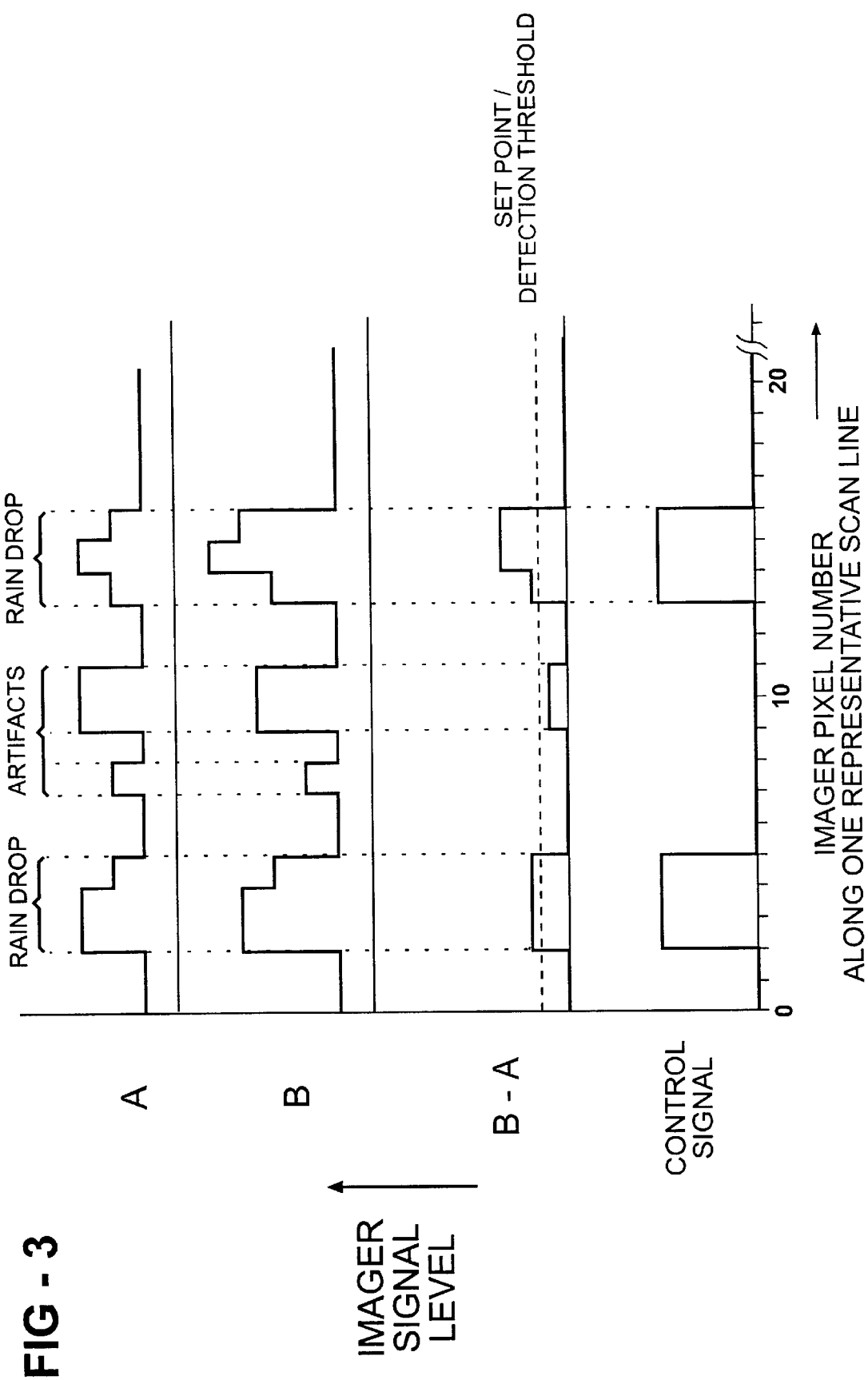
FIG. 3 is illustrates the differential signals produced by the subject invention.

The essential differential signals derived from operation of the present invention are illustrated in FIG. 3. A portion of a typical imager scan line is 'dissected' to show individual image pixel response to a focused image of typical rain drops on an automotive windshield 16.

The first image (A) is captured., and stored digitally as a series of pixel light intensity values, corresponding to the X-Y, i.e., the line and column information read out from the imager array. As noted, certain physical features (presence, size, reflectivity, etc.) of the rain drops 20, i.e., the objects in the viewed object field, give rise to corresponding pixel signals. This first image is derived in ambient light without illumination from the pulsed IR illuminator 18.

A second image frame (B) is then captured and stored digitally, shortly after the first frame. However, during the entire second frame, the IR illuminator 18 is 'on', thereby irradiating the viewed area or a portion of the viewed area with the IR illuminant to which the imager 12, 14, 22 is sensitive. The pixels containing information relating to bona fide rain drops 20 show increased signal levels (in B) relative to non IR illuminated signal levels (in A). In other words, the increased detection levels (in B) are due to the presence of the IR illuminant reflected by the water drops 20 on the glass 16.

The two stored images are digitally subtracted from one-another, yielding a difference image [B-A] as shown. This subtraction may be accomplished on a pixel by pixel basis, row by row basis or column by column basis, depending on the required resolution and sensitivity. As shown, a pixel by pixel subtraction yields information directly related to the presence of rain 20, or other artifacts on the glass such as scratches or chips. That is, the differential image will yield information about rain drops 20 on the glass and will disregard even strong signals due to interfering images within the field of view, such as extraneous specular light sources, interfering artifacts and spurious light signals in the ambient light. A threshold trigger level or comparator setting may then be used, with appropriate control software and filtering by a comparator 36 to produce the actuation signal 30 to operate the wipers, as needed.

In principle, the invention periodically illuminates the image of water drops 20 residing on the outer surface of the windshield 16 while any interfering elements are not illuminated by the light source 18. This methodology is the basis for synchronous detection of a varying parameter, and is well known in the signal processing art. Synchronous detection is particularly useful in extracting low level signals in a 'noisy' background where interfering signals would normally obscure the measured variable.

In the present invention, a pulsed source 18 of illumination is periodically added to any existing ambient light in order to illuminate all or part of the viewed area on the glass 16, with a characteristic radiation, i.e., signature. The reflected illuminant is then imaged by a solid state imager 12 or camera; the captured image frames are stored, digitally processed and analyzed by the controller 26.

Synchronicity is essential, as the pulsed illuminant is used to augment existing light only for alternate image frames. In other words, one image frame of the sensed area on the windshield would be recorded and stored without the added illumination, i.e., absent a pulse of light, and a second image frame would then be recorded and stored with the added illuminant, i.e., pulse of light. These two images would essentially constitute a background signal or ambient image and a background plus illuminant signal or illuminated image. If the ambient image is subtracted from the illuminated image, only those components that reflect the illuminant (reflected light) remain. That is, background light (noise in the ambient condition) is subtracted from the imaged portion of the windshield 16, leaving essentially only raindrop-related information.

Accordingly, the subject invention provides a method for sensing moisture on the exterior surface of a sheet of glass 16 comprising the step of capturing an ambient image (A) of light rays passing through the glass 16 from the exterior to the interior surfaces thereof under ambient light conditions. The method is characterized by illuminating 18 the glass 16 with light rays, capturing an illuminated image (B) of the glass containing the ambient image (A) plus the illuminated image (B) containing the reflected light from the illuminating of the glass 16, and subtracting 26 the ambient image (A) from the illuminated image (B) to produce a moisture signal 30. However, an actuation signal to operate the wipers is produced only in response to the moisture signal 30 reaching a predetermined level. In other words, there must be a minimum level of moisture on the glass 16 to operate the wipers. As disclosed above, the step of illuminating 18 the glass 16 is further defined as pulsing 24 light rays toward the glass 16 to provide pulses of light separated by ambient images. Therefore, in the preferred mode, the illuminated image is captured during the pulses, i.e., while the source of light is "on." The ambient image is captured immediately adjacent each of the illuminated images to define a differential pair of images which are subtracted from one another to provide a series of moisture signals.

In order to be most effective, the differential imaging method of the present invention must be used at a relatively high framing rate. Each pair of images yields one 'net' image because of subtraction. Furthermore, subtraction is only useful if the background information (noise) is essentially invariant, in each frame pair. For example, in a moving vehicle interfering light sources moving across the image field would not be well correlated in subsequent frames unless the frame capture time was small and the sequential framing rate was high.

Some displacement of bright, imaged artifacts (other than rain drops) could be accommodated in software filtering, but rapidly pulsing sources such as turn indicators or flashing signals would be -poorly correlated and may lead to the spurious signals. To that end, fast image (camera) framing rates (over 60 frames per second) or histogram based software algorithms could be used to ameliorate such interference. Therefore, the step of pulsing is preferably further defined as producing at least sixty pulses per second, i.e., the source of light 18 is turned on and off sixty times per second. And, again, the illumination of the glass 16 is accomplished with a light source 18 producing light rays at wavelengths invisible to the human eye. Alternatively or in combination, the method may include the step of optically filtering 14 the ambient light to the imaging device 12 to wavelengths in a predetermined range including the wavelength of the illuminating light rays. As is apparent, the imaging device 12 is positioned adjacent to the interior surface of the sheet of glass 16 to capture the images.

An important aspect of differential image subtraction is the synchronization of the light source 18 with the framing interval of the imager 12 (camera). Since all solid state imagers operate on a scanned (row by row) basis, the pulsed illuminator 18 must be 'on' throughout the specified frame. A possible variant to this frame by frame differential operation would use image pixel by pixel differential operation where the illuminator 18 is pulsed on and off as adjacent pixels are scanned. Of course, such an alternating pixel approach to subtraction would reduce the resolution of the system.

In order to enhance the selectivity of the differential imaging rain sensing system, a narrow band optical filter 22 would be used to limit the sensitivity of the imager 12 to the wavelength of the illuminant 18. When standard 880 nm LEDs are utilized to illuminate the area of interest on the windshield 16, interference filter with a half height 'bandwidth of 40 to 70 nm has provided good results. The function of such a filter is to block as much interfering ambient light as possible, and to pass preferentially the illuminating radiation reflected by the water drops on the outer surface of the windshield. As noted, the actual operating wavelength or range of wavelengths of the illuminator is governed by the requirement of virtual invisibility, but also by the peculiar bandpass characteristics of most automotive windshields.

Automotive glass and particularly windshields are fabricated to limit the transmission of wavelengths outside the visible spectrum. Ultraviolet and near ultraviolet is filtered to prevent fading of car interiors and as a way to improve visibility in haze conditions. Infrared and the near infrared is filtered to reduce the solar heat load to the vehicular cabin. In general, most windshields begin to cut near IR transmission aggressively at wavelengths greater than 800 nm. At 880 nm (a common IR and LED wavelength) windshield transmittance may typically be only 10%, resulting in a two pass transmittance of only 1%. Two optical passes are required because the preferred mounting location for the illuminating LEDs is adjacent the glass inside the vehicle. In that instance, radiation must first pass through the glass to illuminate the water drops 20 on the outside of the glass 16, and then pass back through the glass 16 to the sensor 12. It is therefor important to choose an illuminator 18 wavelength that is not totally or significantly absorbed by the glass itself.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method for sensing moisture on the exterior surface of a sheet of glass comprising the steps of;

capturing an ambient image of light rays made up of a first plurality of pixel light intensity with each value derived from at least one of a plurality of pixels to represent the ambient image of light rays passing through the glass from the exterior to the interior surfaces thereof under ambient light conditions, said method characterized illuminating the glass with rays, capturing an illuminated image made up of a second plurality of pixel light intensity values with each value derived from the same grouping of the plurality of pixels to represent an illuminated image of the glass containing the ambient image plus the illuminated image containing the reflected light pixel light intensity values from the second series of pixel light intensity values to produce a moisture signal in response to increased light intensity values captured by corresponding pixels.

2. A method as set forth in claim 1 including measuring the moisture signal and producing an actuation signal in response to said moisture signal reaching a predetermined level.

3. A method as set forth in claim 1 wherein the step illuminating the glass is further defined as pulsing light rays toward the glass to provide pulses of light separated by ambient images.

4. A method as set forth in claim 2 further defined as capturing an illuminated image during said pulses and capturing an ambient image immediately adjacent each of the illuminated images to define a differential pair of images which are subtracted from one another on a pixel by pixel basis to provide a series of moisture signals.

5. A method as set forth in claim 2 wherein the step of pulsing is further defined as producing at least sixty pulses per second.

6. A method as set forth in claim 1 wherein the step of illuminating the glass with light rays is further defined as illuminating the glass with light rays at wave lengths invisible to the human eye.

7. A method as set forth in claim 1 further including the step of positioning an imaging device adjacent to the interior surface of the sheet of glass to capture the images, optically filtering the ambient light to the imaging device to wavelengths in a predetermined range including the wavelength of the illuminating light rays.

8. An assembly for sensing moisture on an exterior surface of a sheet of glass from a position adjacent the sheet of glass, said assembly comprising;

a light source (18) for illuminating the sheet of glass with light rays, an imager device including a plurality of pixels and adapted for disposition adjacent to the interior surface of the sheet of glass for capturing an ambient image of light rays made up of a first plurality of pixel light intensity values each derived from at least one of said pixels to represent an ambient image of light rays passing through the sheet of glass from the exterior to the interior surface thereof under ambient light conditions and for capturing an illuminated image made up of a second plurality of pixel light intensity values each derived from corresponding grouping of pixels to represent an illuminated image of the sheet of glass containing the reflected light from the illuminating of the sheet of glass, pixel light intensity values from the second series of pixel light intensity values to produce a moisture signal in response to increased light intensity values captured by corresponding pixels.

9. An assembly as set forth in claim 8 wherein said controller includes a moisture signal detector for measuring said moisture signals and producing an actuation signal in response to said moisture signal reaching a predetermined level.

10. An assembly as set forth in claim 8 wherein said light source (18) includes a pulse generator for pulsing light rays toward the glass to provide pulses of light separated by ambient images.

11. An assembly as set forth in claim 10 wherein said controller includes a synchronizing device for controlling said imager device for capturing the illuminated image during said pulses and capturing the ambient image immediately adjacent each capture of the illuminated images to define a differential pair of images which are subtracted from one another on a pixel by pixel basis to provide a series of moisture signals.

12. An assembly as set forth in claim 8 wherein said light source (18) emits light rays at wavelengths invisible to the human eye.

13. An assembly as set forth in claim 8 including a filter for optically filtering the ambient light to the imager device to wavelengths in a predetermined range including the wavelength of the illuminating light rays.

* * * * *